(12) United States Patent
Ichida et al.

(10) Patent No.: US 7,762,916 B2
(45) Date of Patent: Jul. 27, 2010

(54) FRONT DERAILLEUR FOR BICYCLE

(75) Inventors: Tadashi Ichida, Ikoma (JP); Kazuhiro Fujii, Kawachinagano (JP)

(73) Assignee: Shimano Inc., Osaka (JP)

( * ) Notice: Subject to any disclaimer, the term of this patent is extended or adjusted under 35 U.S.C. 154(b) by 1109 days.

(21) Appl. No.: 11/092,615

(22) Filed: Mar. 30, 2005

(65) Prior Publication Data

US 2005/0288139 A1 Dec. 29, 2005

(30) Foreign Application Priority Data

Jun. 23, 2004 (JP) ............................. 2004-184430

(51) Int. Cl.
*F16H 7/00* (2006.01)
*F16H 9/00* (2006.01)
(52) U.S. Cl. .............................. 474/82; 474/80; 474/78
(58) Field of Classification Search .................. 474/80, 474/82
See application file for complete search history.

(56) References Cited

U.S. PATENT DOCUMENTS

| 3,748,916 | A |   | 7/1973  | Morse            |         |
|-----------|---|---|---------|------------------|---------|
| 4,030,374 | A | * | 6/1977  | Isobe            | 474/82  |
| 4,226,130 | A |   | 10/1980 | Isobe et al.     |         |
| 4,586,913 | A |   | 5/1986  | Nagano et al.    |         |
| 4,756,704 | A | * | 7/1988  | Nagano           | 474/144 |
| 4,955,849 | A | * | 9/1990  | Nagano           | 474/80  |
| 5,037,355 | A |   | 8/1991  | Kobayashi et al. |         |
| 5,104,358 | A |   | 4/1992  | Kobayashi et al. |         |
| 5,389,043 | A | * | 2/1995  | Hsu              | 474/80  |
| 5,624,336 | A |   | 4/1997  | Kojima           |         |
| 5,816,966 | A | * | 10/1998 | Yang et al.      | 474/82  |
| 5,897,451 | A |   | 4/1999  | Ichida           |         |
| 6,093,122 | A | * | 7/2000  | McLaughlin et al.| 474/82  |
| 6,234,927 | B1|   | 5/2001  | Peng             |         |
| 6,641,495 | B2| * | 11/2003 | Valle            | 474/80  |
| 6,695,729 | B2| * | 2/2004  | Ozaki            | 474/80  |
| 2004/0005951 | A1 | | 1/2004 | Tsai et al.      |         |

FOREIGN PATENT DOCUMENTS

| DE | 3400432 A1   | 7/1985  |
| DE | 19703933 A1  | 8/1998  |
| EP | 0655386 A1   | 5/1995  |
| EP | 1281610 A2   | 2/2003  |
| EP | 0875445 B1   | 11/2003 |
| FR | 1499803 A    | 10/1967 |
| FR | 2532608 A    | 3/1984  |
| GB | 1008051      | 5/1965  |
| JP | S64-51594 U  | 3/1989  |
| JP | H05-338581 A | 12/1993 |
| JP | H08-169382 A | 7/1996  |

* cited by examiner

*Primary Examiner*—Bradley T King
*Assistant Examiner*—Mahbubur Rashid
(74) *Attorney, Agent, or Firm*—Global IP Counselors, LLP

(57) ABSTRACT

A front derailleur basically comprises a base member, a chain guide, inner and outer links, a first arm portion, and a coil spring. The chain guide is freely swingably coupled to the base member to guide a chain in a direction of shifting gears. Each of the outer link and the inner link has first and second sections freely rotatably coupled to the base member and the chain guide, respectively. The outer link and the inner link are disposed substantially parallel to each other. The first arm portion extends in a direction away from the base member. The coil spring has first and second ends connected to the base member and a free end of the first arm portion such that a biasing force is applied on the chain guide in a direction toward a frame of the bicycle when the base member is installed on the frame.

19 Claims, 15 Drawing Sheets

FRONT DERAILLEUR FOR BICYCLE

CROSS-REFERENCE TO RELATED APPLICATIONS

This application claims priority to Japanese Patent Application No. 2004-184430. The entire disclosure of Japanese Patent Application No. 2004-184430 is hereby incorporated herein by reference.

BACKGROUND OF THE INVENTION

1. Field of the Invention

The invention relates to a bicycle derailleur. More specifically, this invention relates to a front derailleur for a bicycle adapted to be installed on a frame of the bicycle, configured and arranged to be connected to a gear shift to guide a chain into one of a plurality of gear shifting positions in accordance with movement of the gear shifting cable.

2. Background Information

Japanese Laid-Open Patent Publication No. H08-169382 discloses a conventional a gear shifting device of a bicycle, a front derailleur, which is configured and arranged to guide a chain into one of a plurality of front sprockets. The conventional front derailleur is provided with a base member installed on a frame of the bicycle, internal and outer links arranged in parallel and are mutually freely rotatably connected on one ends to the base member, and a chain guide connected to the other ends of the internal and outer links to guide the chain. In the conventional front derailleur, a twist coil spring is provided for applying a biasing force to the chain guide in a direction toward the frame. The twist coil spring is disposed around a connecting shaft between the base member and the external or inner link. The internal or outer link is configured and arranged to be attached to a shift cable.

In the conventional front derailleur as disclosed in the above mentioned reference, when the shift cable is pulled by the gear shifting operation, the internal and outer links swings so that the chain guide moves in a direction away from the frame to up-shift the gear. Then, when the shift cable is returned by the gear shifting operation, the biasing force by the twist coil spring moves the chain guide in a direction toward the frame to down-shift the gear.

In the conventional front derailleur, as the biasing force is applied on the chain guide in the direction toward the frame via the internal or outer link due to the twist coil spring, the spring force becomes greater in proportion to the rotation amount of the internal or outer link (e.g., a twisting amount of the twist coil spring). Thus, the torque acting on the internal or outer link becomes greater in proportion to the rotation amount of the internal or outer link as well. Therefore, when the gear is up-shifted into the highest speed, the maximum force acts upon the shift cable and the greatest operational force is necessary for up-shifting operation. As a result, the shifting operation becomes difficult because a greater force is required for the gear shift operation when the gear shift operation is performed manually by a gear shifting member. Also, when the gear shift operation is performed by using a motor, a large motor is required to generate a required torque. Thus, life of the power source is influenced and it is difficult to design the bicycle to be lightweight.

In view of the above, it will be apparent to those skilled in the art from this disclosure that there exists a need for an improved front derailleur. This invention addresses this need in the art as well as other needs, which will become apparent to those skilled in the art from this disclosure.

SUMMARY OF THE INVENTION

One object of the present invention is to provide a front derailleur of a bicycle in which a required operational force during up-shifting operation is reduced as much as possible.

The foregoing objects can basically be attained by providing a front derailleur that is adapted to be installed on a frame of the bicycle for guiding a chain into one of a plurality of shift positions in accordance with movement of a transmission member. The front derailleur comprises a base member, a chain guide, an inner link, an outer link, a first arm portion and a coil spring. The base member is configured and arranged to be installed on the frame. The chain guide is configured and arranged to be freely movable with respect to the base member in a shifting direction away from the base member to guide the chain into one of the shift positions. The inner link with first and second sections is freely rotatably connected to the base member and the chain guide, respectively. The outer link is disposed substantially parallel to the inner link in a position spaced apart from the base member with respect to the inner link with first and second sections being freely rotatably connected to the base member and the chain guide, respectively. The first arm portion extends from one of the inner link and the outer link in a direction away from the base member. The coil spring with first and second ends connected to the base member and an free end of the first arm portion, respectively, the coil spring is configured and arranged to apply a biasing force on the chain guide in a direction toward the frame when the base member is installed on the frame.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
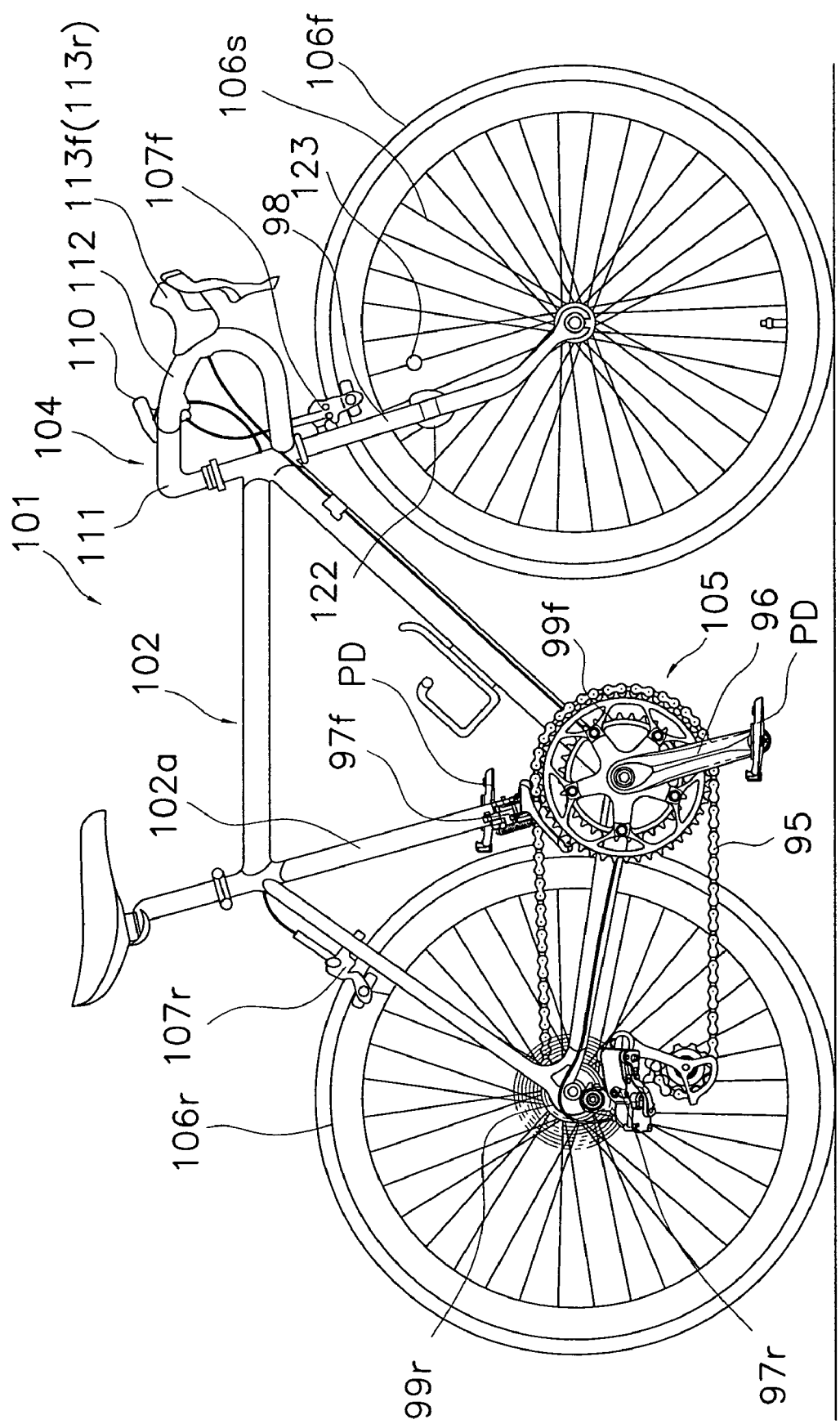
FIG. 1 is a side elevational view of a bicycle with a front derailleur in accordance with a first embodiment of the present invention.

Referring initially to FIG. 1, a bicycle 101 with a front derailleur 97f is illustrated in accordance with a first embodiment of the present invention. As seen in FIG. 1, the bicycle 101 is arranged as a road racer that basically comprises a diamond-shaped frame 102, a handle 104, a drive unit 105, a pair of front and rear wheels 106f and 106r, a pair of front and rear brake devices 107f and 107r and a gear control device 110. The diamond-shaped frame 102 has a front fork 98 to which the handle 104 is fixedly coupled. The drive unit 105 basically comprises a chain 95, a crank 96, a pair of front and rear derailleurs 97f and 97r and a pair of front and rear sprocket sets 99f and 99r. A pair of pedals PD is coupled to the crank 96. The front and rear wheels 106f and 106r are installed on the front fork 98 and rear portion of the frame 102, respectively as seen in FIG. 1. The gear control device 110 is configured and arranged to control the front and rear derailleurs 97f and 97r.

Figure 2:
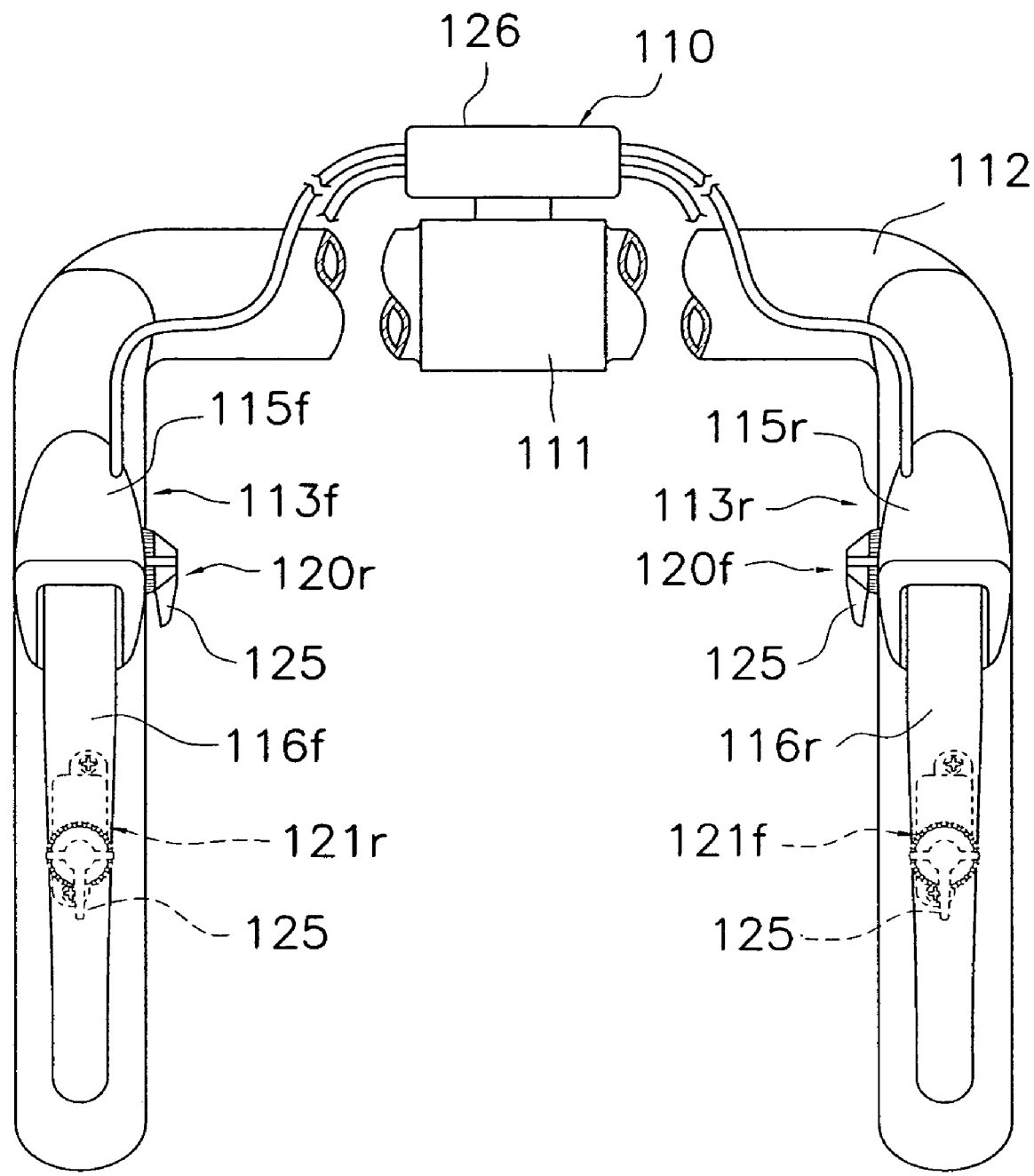
FIG. 2 is a front elevational view of a handle portion of the bicycle illustrated in FIG. 1 in accordance with the first embodiment of the present invention.
Figure 3:
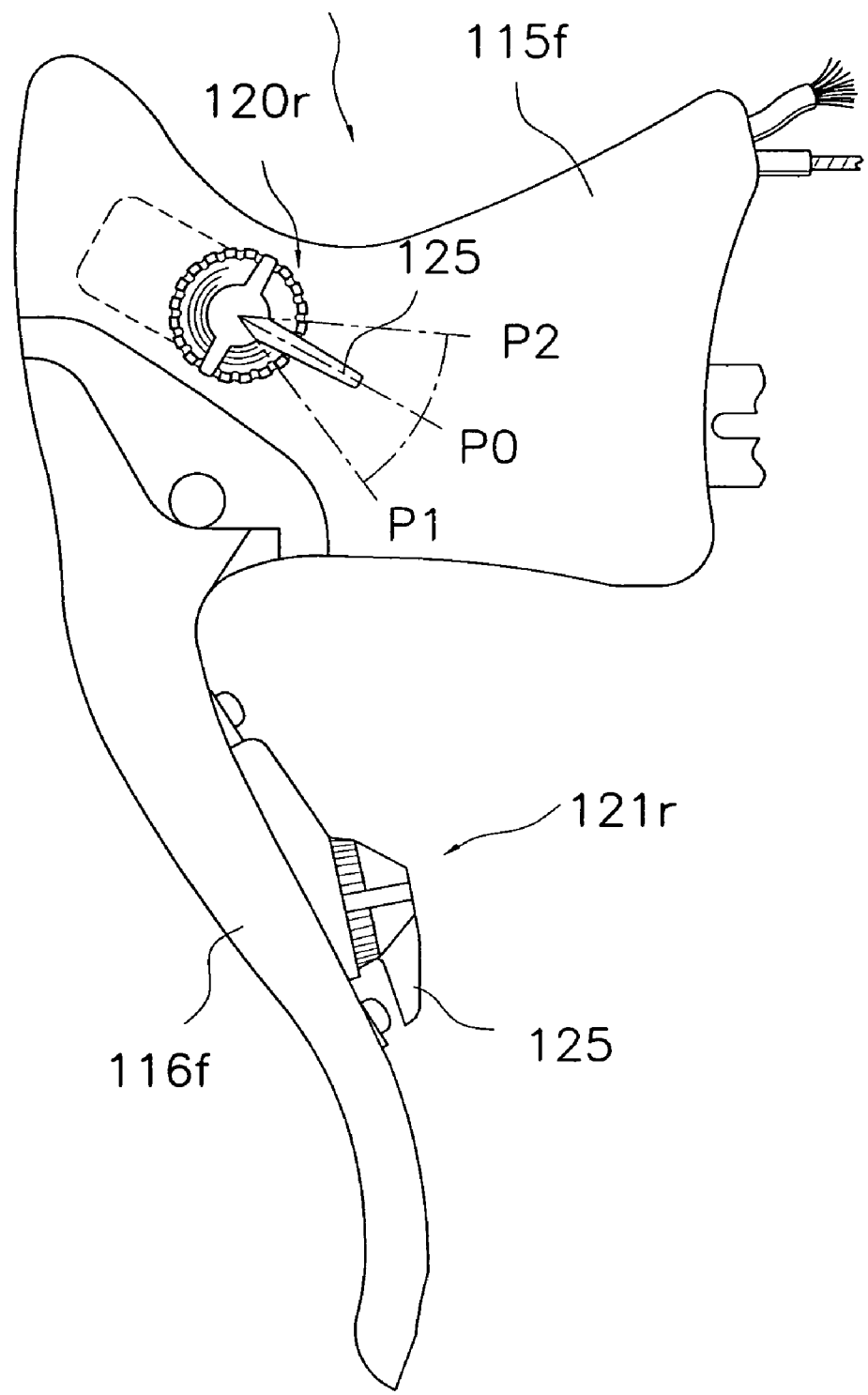
FIG. 3 is a side elevational view of a rear break lever of the handle portion of the bicycle in accordance with the first embodiment of the present invention.
Figure 4:
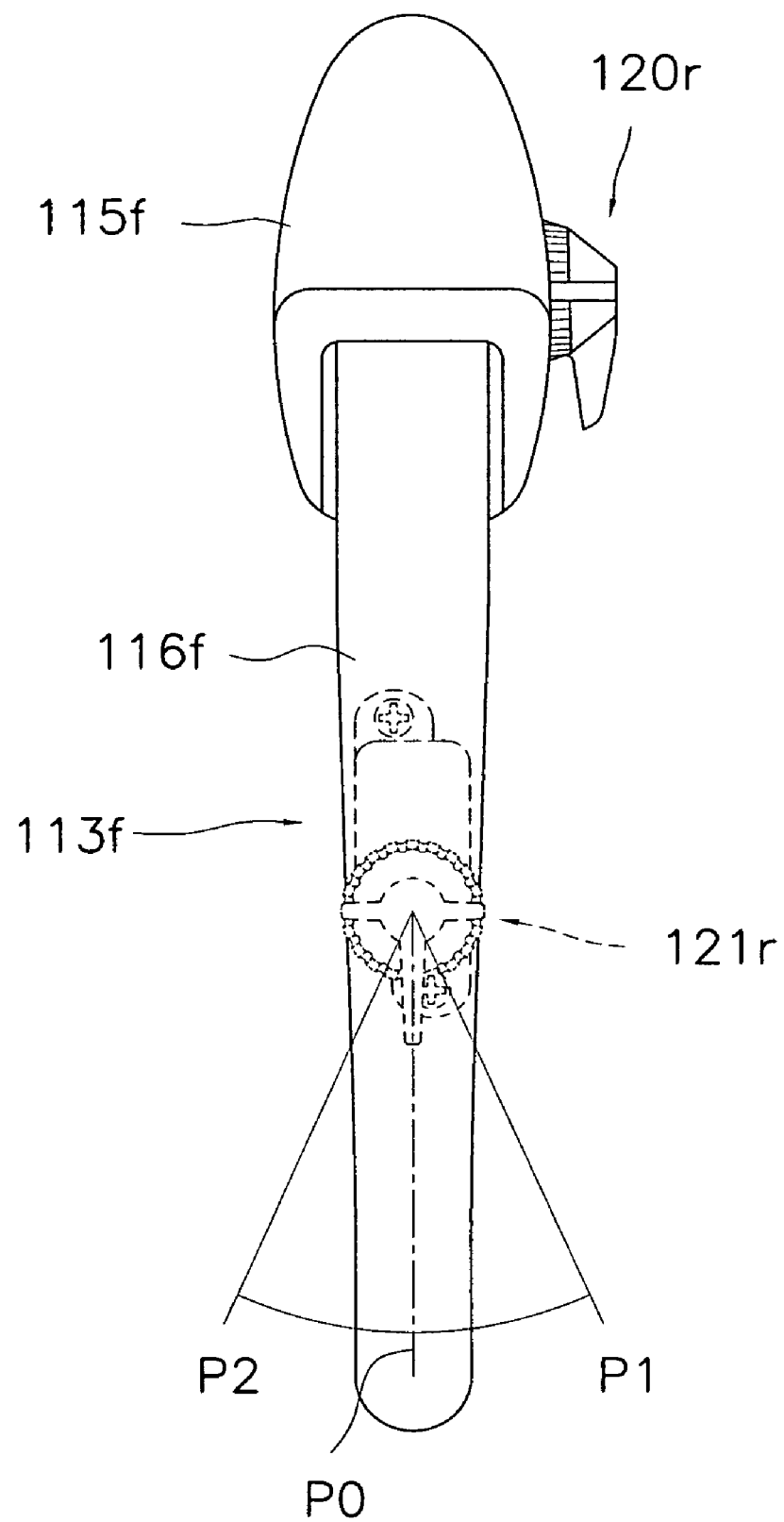
FIG. 4 is a front elevational view of the rear break lever illustrated in FIG. 3 in accordance with the first embodiment of the present invention.

As seen in FIG. 2, the handle 104 basically comprises a handle stem 111 and a handle bar 112 that is fixedly coupled to the upper end portion of the handle stem 111. The handle stem 111 is fixedly coupled to the upper part of the front fork 98. The handle bar 112 is a drop handle type handle bar that is provided with a pair of brake levers 113f and 113r on the right side and left side, respectively. The brake levers 113f and 113r as shown in FIGS. 2 to 4 have front and rear brake brackets 115f and 115r installed at the end of the brake levers 112, respectively, and front and rear lever members 116f and 116r that are installed to swing freely with respect to the brake brackets 115f and 115r.

On the inner side surfaces of the break brackets 115f and 115r and on the rear side surfaces of the lever members 116f and 116r, a pair of front and rear gear shift operating parts 120f and 120r and a pair of front and back gear shift operating parts 121f and 121r, respectively, are provided respectively for operating the gear shifting of the front and rear derailleurs 97f and 97r. The front gear shift operating part 120f and the rear gear shift operating part 120r are provided separately so that the front and rear gear shift operating parts 120f and 120r can be operated when the hands of the driver are placed on the rear brake bracket 115r and the front brake bracket 115f, respectively. The front gear shift operating part 121f and the rear gear shift operating part 121r are provided separately so that the front and rear gear shift operating parts 121f and 121r can be operated when the hands are placed on the rear lever member 116r and front lever member 116f, respectively.

Figure 6:
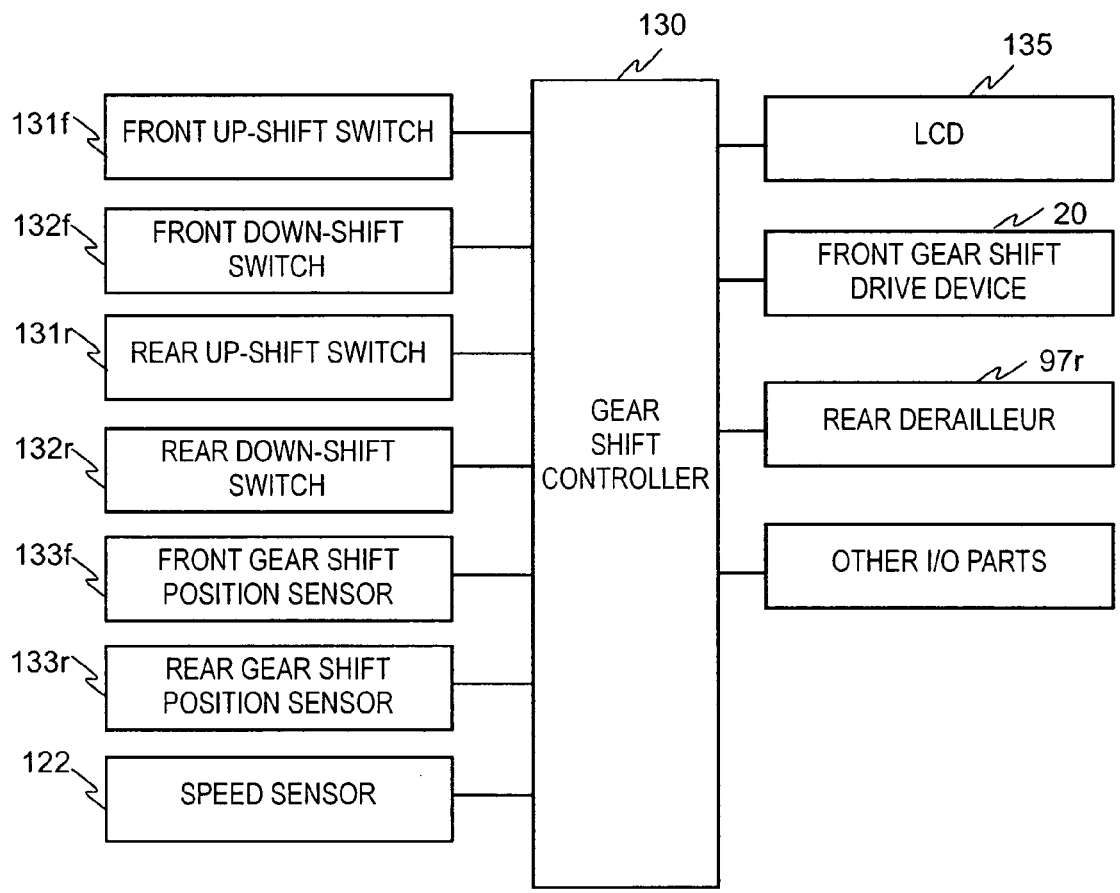
FIG. 6 is a block diagram illustrating a configuration of a gear shift control device of the bicycle in accordance with the first embodiment of the present invention.

Each of the gear shift operating parts 120f, 120r, 121f and 121r has a gear shift operating member 125 configured and arranged to freely move between a neutral position PO, a first position rotated from the neutral position PO down (for the front and rear gear shift operating parts 120f and 120r) or inward (for the front and rear gear shift operating parts 121f and 121r), and a second position P2 rotated from the neutral position PO up (for the front and rear gear shift operating parts 120f and 120r) or outward (for the front and rear gear shift operating parts 121f and 121r). Each of the gear shift operating members 125 is biased toward the neutral position PO. Also, the gear shift operating parts 120f and 121f, as shown in FIG. 6, are internally coupled to a front up-shifting switch 131f and a front down-shifting switch 132f, respectively. Likewise, the gear shift operating parts 120r and 121r are internally coupled to a rear up-shifting switch 131r and a rear down-shifting switch 132r. Thus, in the first embodiment, when one of the gear shift operating members 125 is put into the first position P1, the respective one of the front and rear up-shifting switches 131f and 131r is turned on. When one of the gear shift operating members 125 is put into the second position P2, the respective one of the front and rear down-shifting switches 132f and 132r is turned on. These combinations are suitably arranged.

As seen in FIGS. 2 and 6, the gear shift control device 110 has a case 126 installed on a center portion of the handle bar 112, a gear shift controller 130 consisting of a microcomputer housed in the case 126, and the above mentioned gear shift operating parts 120f, 120r, 121f and 121r. Also, the gear shift control device 110 has a liquid crystal display 135 mounted on the case 126. The gear shift controller 130 is connected to the front and rear up-shifting switches 131f and 131r and the front and rear down-shifting switches 132f and 132r (constituting the gear shift operating parts 120f, 120r, 121f and 121r), a speed sensor 122 installed on the front fork 98, the front and rear derailleurs 97f and 97r and I/O parts. The speed sensor 122 is configured and arranged to detect the revolutions of the front wheel 106f by detection of a magnet 123 installed on a spoke 106s of the front wheel 106f. Moreover, the speed sensor 122 is configured and arranged to output the revolution signal to the gear shift controller 130 with or without wire.

The gear shift controller 130 is configured to control the shifting of the front and rear derailleurs 97f and 97r corresponding to the signal from the front and rear up-shift switches 131 and 131r and the front and rear down-shift switches 132f and 132r and from the front and rear gear shift position sensors 133f and 133r. Furthermore, the mileage is displayed together with speed and gear shift position in the liquid crystal display 135 by the signal from the speed sensor 122 and the gear shift position sensors 133f and 133r.

Figure 7:
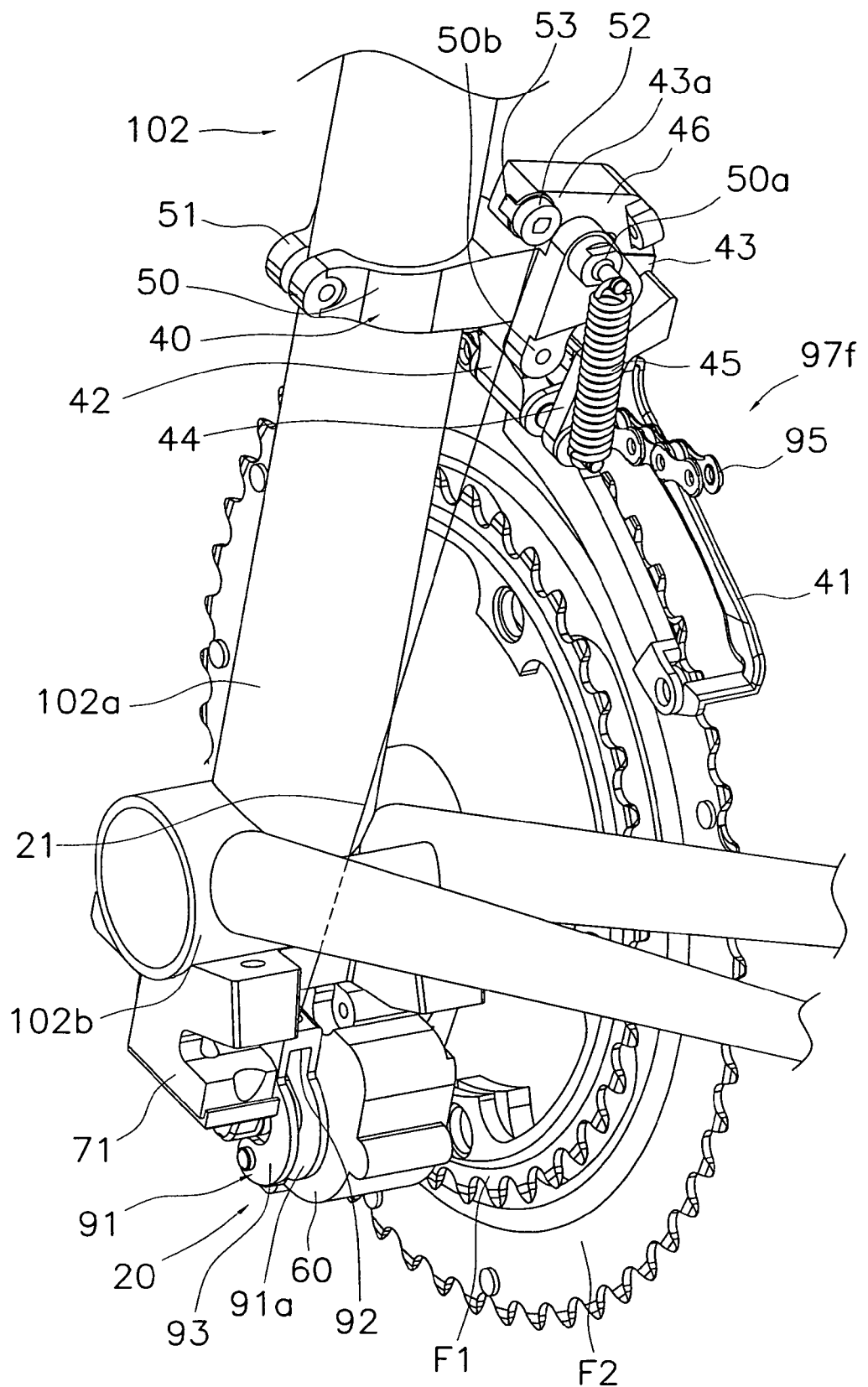
FIG. 7 is a perspective view of a front derailleur and peripheral components of the bicycle in accordance with the first embodiment of the present invention.
Figure 8:
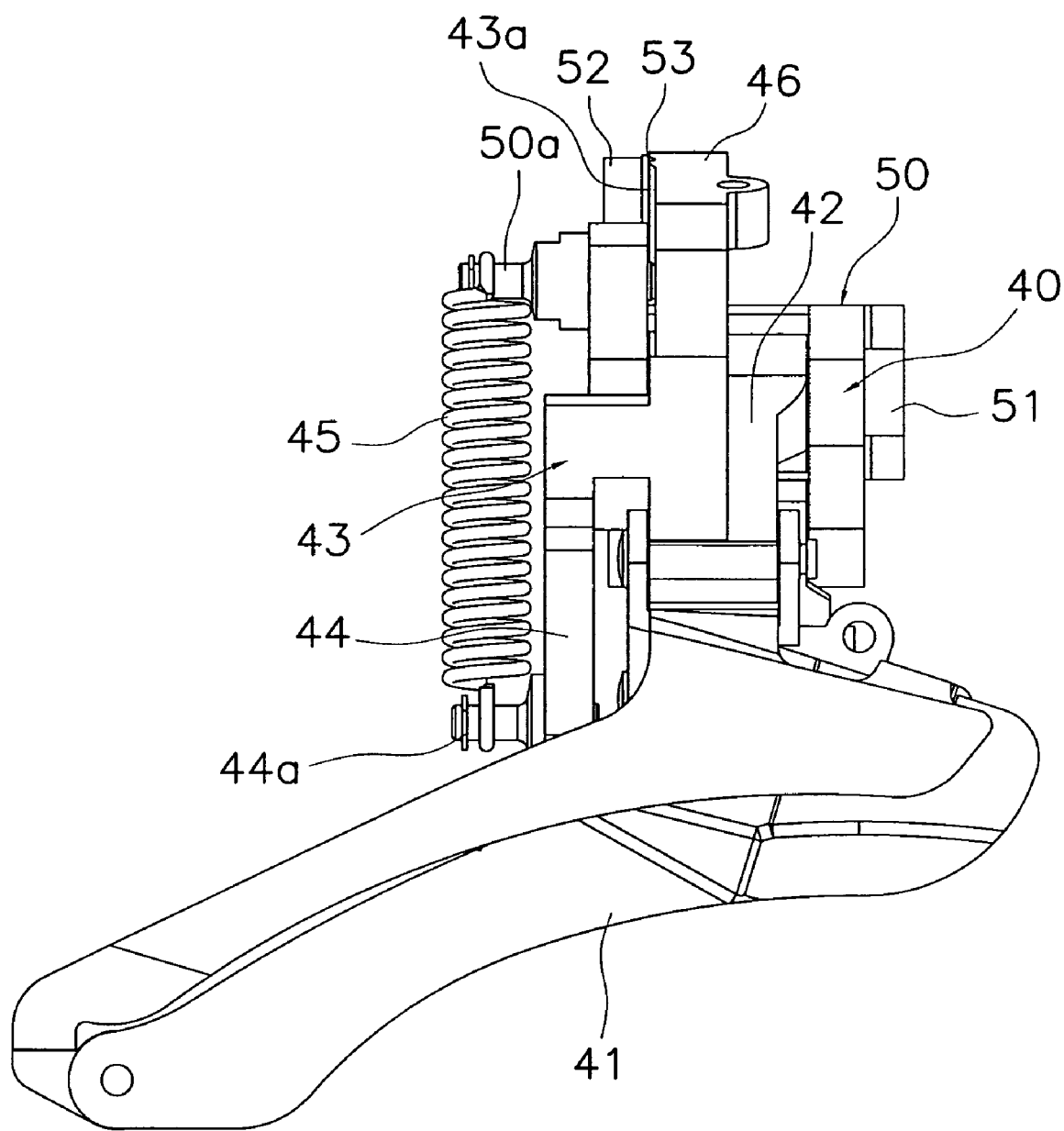
FIG. 8 is a side elevational view of the front derailleur illustrated in FIG. 7 in accordance with the first embodiment of the present invention.

As mentioned above, the drive unit 105 comprises the chain 95, the front and rear derailleurs 97f and 97r, and the front and rear sprocket sets 99f and 99r. The front and rear derailleurs 97f and 97r are configured and arranged to carry out detaching and mounting of the chain 95 on one of the sprockets. The front derailleur 97f is provided on the seat tube 102a of the frame 102 as seen in FIG. 7. The front derailleur is configured and arranged to guide the chain 95 into one of two gear shift positions. The front derailleur 97f is connected via a shift cable 21 (an example of a transmitting member) to the front gear shift drive device 20 (i.e., a gear shift drive device) installed on a hanger portion 102b of the frame. Furthermore, in this embodiment, the gear shift cable 21 preferably uses only the inner cable of a Bowden-type cable. The rear derailleur 97r is an electronically controlled derailleur which has ten gear shift positions and is provided on the rear part of the frame 102. The front and rear derailleurs 97f and 97r are configured and arranged to be operated with a power supply (not shown) of the bicycle 101. The front gear shift drive device 20 and the rear derailleur 97r, respectively, as shown in FIG. 6, have the gear shift position sensors 133f and 133r which detect the gear shift position.

Figure 5:
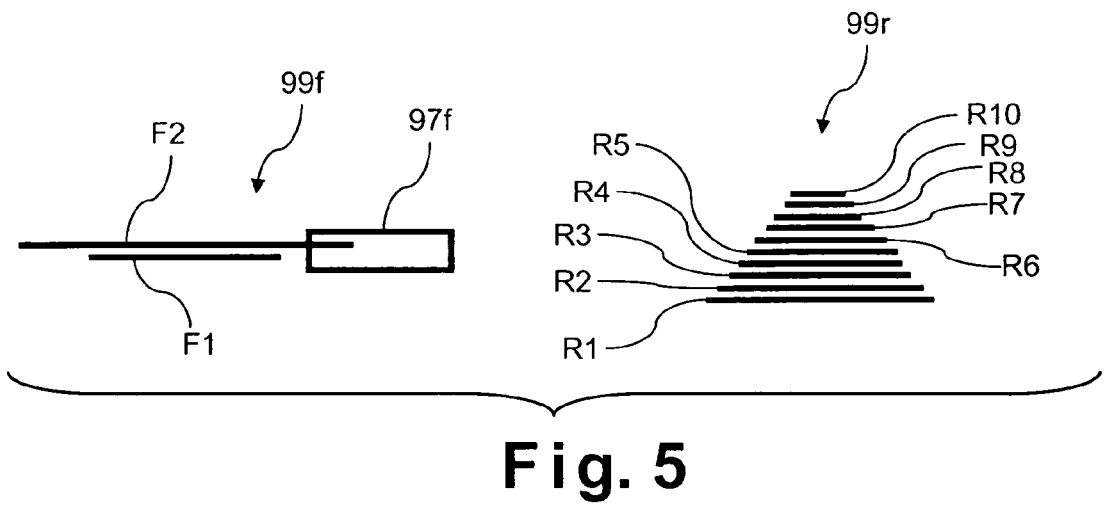
FIG. 5 is a simplified diagrammatic view of front and rear sprocket sets of the bicycle in accordance with the first embodiment of the present invention.

As seen in FIG. 5, the front sprocket set 99f preferably has two sprockets F1 and F2 with a differing number of teeth arranged in axial alignment on the crank shaft. The rear sprocket set 99r preferably has ten sprockets R1 to R10 with a differing number of teeth arranged in axial alignment parallel to the hub axis of the rear wheel 106r. In this embodiment of the present invention, the inside sprocket F1 of the front sprocket set 99f has fewer teeth than the outside sprocket F2. Also, from the innermost sprocket R1 of the rear sprocket set 99r, the number of teeth decrease in order, so that the outermost sprocket R10 has the fewest number of teeth. The front and rear derailleurs 97f and 97r are configured and arranged to carry out the gear shifting operation by transferring the chain 95 to any of the several sprockets F1, F2, and R1 to R10. This gear shifting operation is carried out by the gear shifting operation parts 120f, 120r, 121f and 121r.

Figure 9:
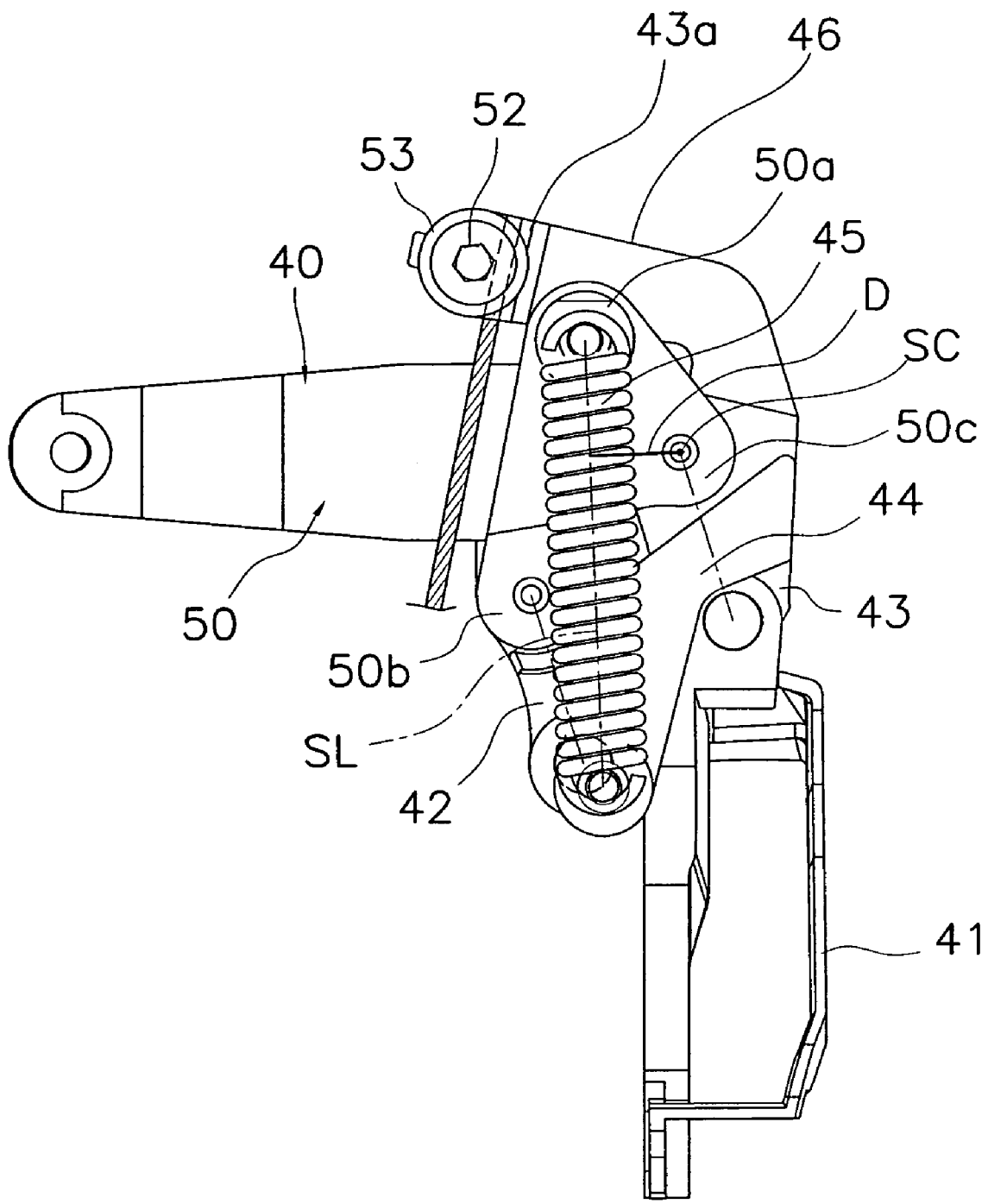
FIG. 9 is a rear elevational view of the front derailleur illustrated in FIGS. 7 and 8 showing when the front derailleur is in high speed position in accordance with the first embodiment of the present invention.
Figure 10:
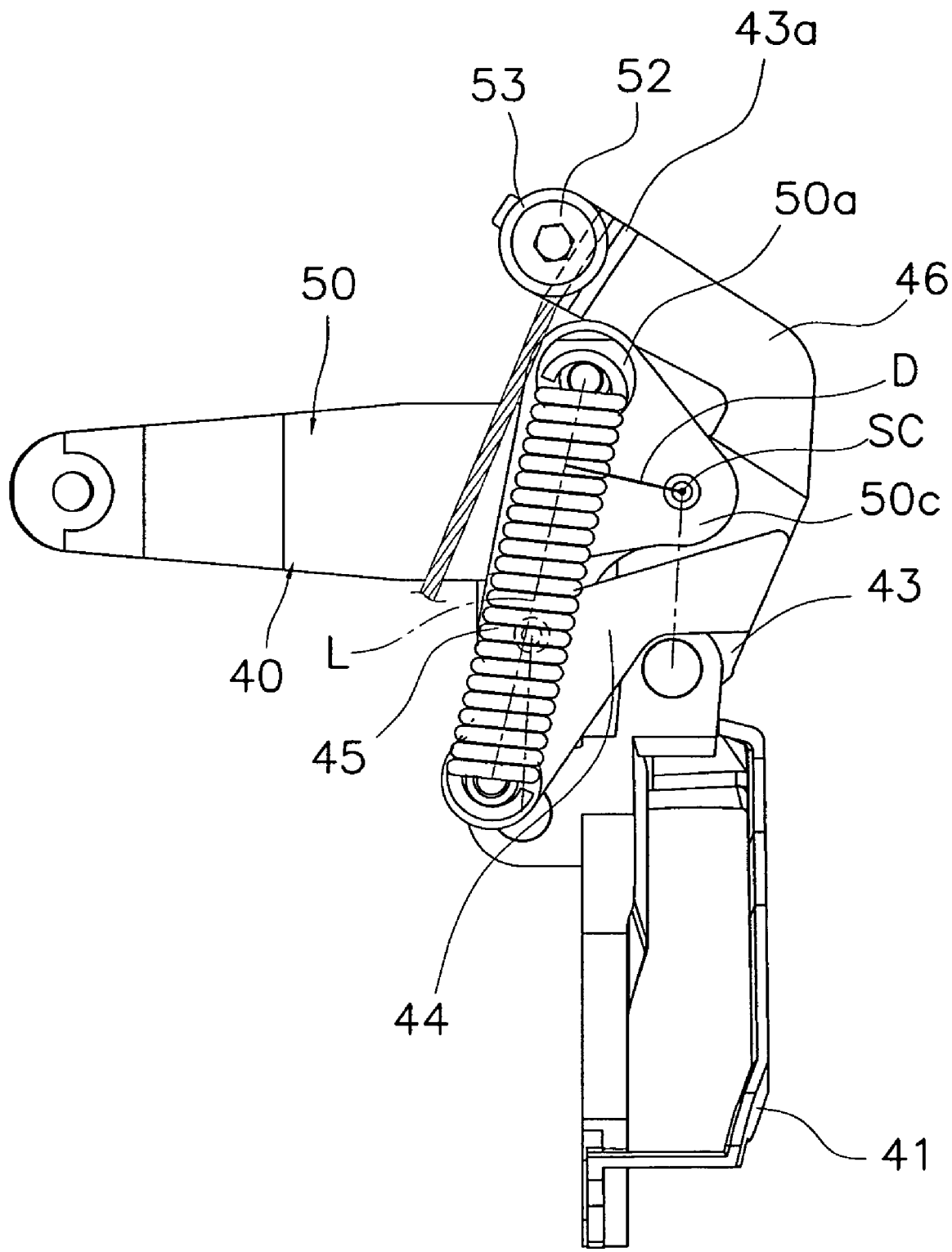
FIG. 10 is a rear elevational view of the front derailleur illustrated in FIGS. 7 to 9 showing when the front derailleur is in low speed position in accordance with the first embodiment of the present invention.

As shown in FIGS. 7 to 10, the front derailleur 97f is a down-swing type derailleur that basically comprises a base bracket 40 (base member), a chain guide 41, an inner link 42, and an outer link 43. The base bracket 40 is installed on the seat tube 102a. The chain guide 41 is configured and arranged to move freely in a direction opposite the base bracket 40. The inner link 42 and the outer link 43 couple the base bracket 40 with the chain guide 41 so that the chain guide 41 freely swing with respect to the base bracket 40. The inner link 42 and the outer link 43 are disposed substantially parallel to each other. Furthermore, the front derailleur 97f has a first arm portion 44, a coil spring 45 and a second arm portion 46. The first arm portion 44 extends from the outer link 43 in a direction away from the base bracket 40 toward the seat tube 102a as seen in FIGS. 7 to 10. The coil spring 45 exerts a biasing force on the chain guide 41 in a direction toward the seat tube 102a. The coil spring 45 is connected to the base bracket 40 and a free end of the first arm portion 44 at both ends of the coil spring 45. The second arm portion 46 extends from the outer link 43 in the direction away from the base bracket 40 toward the seat tube 102a as seen in FIGS. 7 to 10. The gear shift cable 21 is attached to a tip of the second arm portion 46. FIG. 9 illustrates when the front derailleur 97f is arranged in the high gear position with the chain guide 41 positioned on the outside and FIG. 10 illustrates when the front derailleur 97f is arranged in the low gear position with the chain guide 41 positioned on the inside.

As shown in FIG. 7, the base bracket 40 comprises a first base member 50 and a second base member 51 that is arranged to open and close freely with respect to the first base member 50 to surround the seat tube 102a along with the first base member 50. The first base member 50 includes a protruded shaft-shaped spring retaining portion 50a together with the provision above of a protruding shaft-form spring retaining portion 50a which retains an upper end of the coil spring 45. Moreover, two inner link support portions 50b is provided on the first base member 50 under the spring retaining portion 50a so that the inner link 42 is freely swingably supported between the inner link support portions 50b. Furthermore, the first base member 50 includes a pair of outer link support portions 50c above the inner link support portions 50b so that the outer link 43 is freely swingably installed between the outer link support portions 50c.

The chain guide 41 is freely swingably connected to lower ends of the inner link 42 and the outer link 43. The chain guide 41 is configured and arranged to guide the chain 95 into one of the two gear shift positions (i.e., the sprocket F1 or F2).

In the first embodiment of the present invention, the inner link 42 is preferably disposed below the base bracket 40 when the base bracket 40 is installed on the seat tube 102a as seen in FIG. 7. Both upper and lower ends of the inner link 42 are freely rotatably connected to the base bracket 40 and the chain guide 41, respectively. The inner link 42 has the upper end (first section) that is freely swingably connected between the inner link support portions 50b of the first base member 50. The lower end (second section) of the inner link 42 is freely swingably connected to the chain guide 41.

The outer link 43 is disposed farther apart from the base bracket 40 with respect to the inner link 42. The inner link 42 and the outer link 43 are arranged substantially parallel to each other. Both ends of the outer link 43 are freely swingably connected to the outer link support portions 50c of the base bracket 40 and the chain guide 41. In other words, the outer link 43 includes first and second sections that are coupled to the base bracket 40 and the chain guide 41, respectively. The first section of the outer link 43 is freely swingably connected to the outer link support portions 50c, and a second arm portion 46, which extends in a curve shape in a direction away from the base racket 40 and toward the seat tube 102a, is formed integrally with the outer link 43. On the extended tip of the second arm portion 46, a cable retaining portion 43a is provided to fasten the gear shift cable 21 with a bolt. The cable retaining portion 43a includes a fixed bolt 52 and a lug washer 53 so that one end of the gear shift cable 21 is installed between the lug washer 53 and the cable retaining portion 43a, and fastened by being locked in by the fixed bolt 52.

The first arm portion 44 extends from a portion between where the outer link 43 is coupled to the base bracket 40 (first section) and where the outer link 43 is coupled to the chain guide 41 (second section) in a direction away from the base bracket 40 and toward the seat tube 102a as seen in FIGS. 7 to 10. The first arm portion 44 is provided to retain a lower end of the coil spring 45 with the upper end of the coil spring 45 being attached to the base bracket 40. Thus, a protruded shaft-shaped spring retaining portion 44a is formed on a tip of the first arm portion 44 to retain the lower end of the coil spring 45.

The first arm portion 44 of the outer link 43 is configured and arranged such that, when the front derailleur 97f moves to the high speed position shown in FIG. 9 from the low speed position shown in FIG. 10, the first arm portion 44 does not interfere with the chain guide 41, and the coil spring 45 is disposed in a position where a distance D between a center of rotation SC of the outer link support portions 50c, which is the center of rotation of the outer link 43, and a center axis SL of the coil spring 45 becomes the shortest as shown in FIG. 9. The distance D becomes short with the motion of the chain guide 41 from the low speed position to the high speed position. Thus, by disposing the center axis SL of the coil spring 45 close to the center of rotation SC of the outer link 43, the torque arising from the biasing force of the coil spring 45 becomes small and the operating force (the force pulling the gear shift cable 21) in the vicinity of the high speed position (the position where the chain guide 41 approaches the sprocket F2) becomes lower when the coil spring 45 is at its farthest extension with the strongest biasing force. Accordingly, when the drawing operation of the gear shift cable 21 is performed in the gear shift operating section, the operating force required becomes relatively small. Moreover, in the case of the gear shift operated by a motor with the front drive art 20 as in the first embodiment, the necessary torque decreases for the gear shifting of the motor.

Also, the second arm portion 46 is provided so that the distance between the cable retaining portion 43a, to which the gear shift cable 21 is attached, and the center of rotation SC becomes relatively large. Therefore, the force applied on the gear shift cable 21 can be further smaller.

Figure 11:
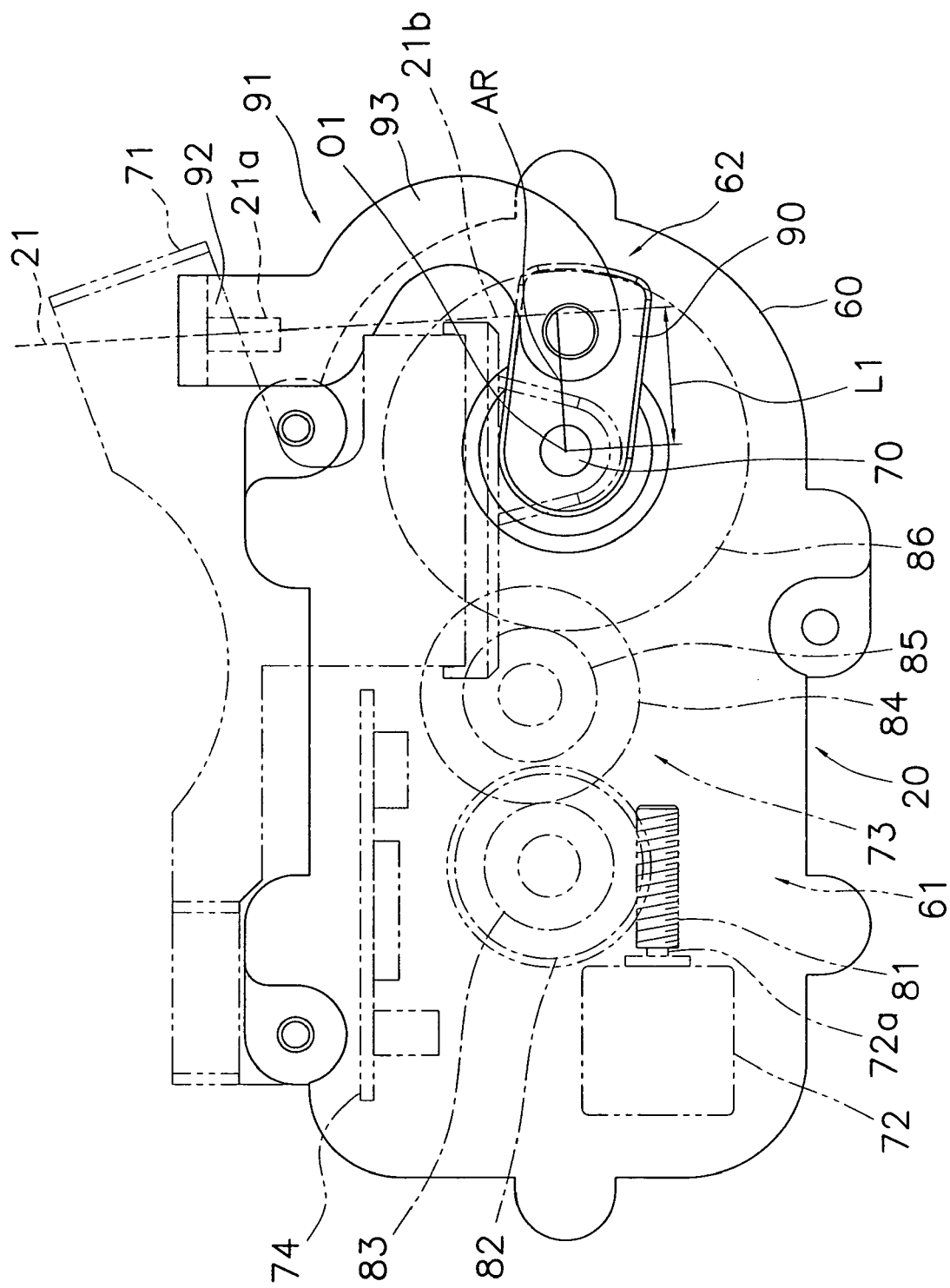
FIG. 11 is a side elevational view of a front gear shift drive device showing when the front gear shift drive device is in low speed position in accordance with the first embodiment of the present invention.
Figure 12:
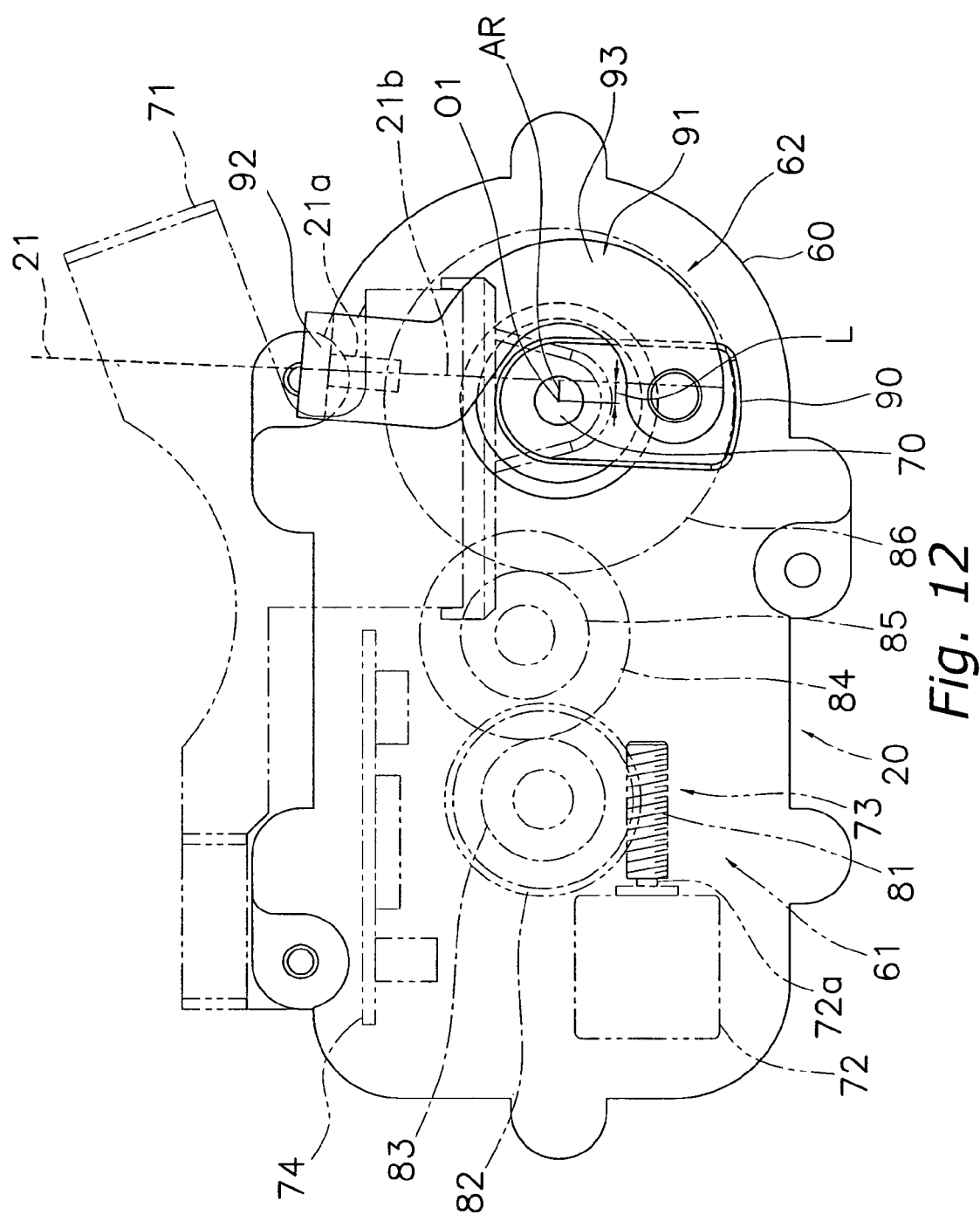
FIG. 12 is a side elevational view of the front gear shift drive device showing when the front gear shift drive devise in high speed position in accordance with the first embodiment of the present invention.

As shown in FIGS. 7, 11 and 12, the front gear shift drive device 20 comprises, for example, a case member 60, a motor drive mechanism 61 and a linking structure or cable linking portion 62. The case member 60 is mounted on the hanger portion 102b of the frame 102 of the bicycle 101. The motor drive mechanism 61 has a revolving shaft 70, and mounted on the case member 60. The cable linking portion 62 is coupled to the gear shift cable 21. FIG. 11 shows the low gear position (with the chain guide 41 on the sprocket F1 side), and FIG. 12 shows the high gear position (with the chain guide 41 on the sprocket F2 side). The case member 60 has a space inside thereof for housing the motor drive mechanism 61, and is mounted onto a mounting bracket 71 affixed to the hanger portion 102b.

The motor drive mechanism 61 has a motor 72, a reduction gear mechanism 73 positioned between the motor 72 and the revolving shaft 70, and a motor drive circuit 74 for driving the motor 72 in response to a command from the gear shift controller 130.

The reduction gear mechanism 73 is configured and arranged to transmit rotation of the motor 72 to the revolving shaft 70 at reduced speed, and has a worm gear 81 rotatably installed on the output shaft 72a of the motor 72, a worm wheel 82 that meshes with the worm gear 81, and a first small-diameter gear 83 disposed concentrically with the worm wheel 82. The reduction gear mechanism 73 also has a first large-diameter gear 84 that meshes with the first small-diameter gear 83, a second small-diameter gear 85 disposed concentrically with the first large-diameter gear 84, and a second large-diameter gear 86 that meshes with the second small-diameter gear 85. The revolving shaft 70 is coupled to the second large-diameter gear 86 as seen in FIGS. 11 and 12. The front shift position sensor 133f is preferably disposed between the second large-diameter gear 86 and the inside surface of the case member 60 for detecting the shift position (detecting the rotation position of the second large-diameter gear 86) as mentioned above. In the first embodiment, since speed is reduced using the worm wheel 82 and the worm gear 81 having a lock function, the reduction gear mechanism 73 will not rotate even if force acts from the output end. Therefore, the cable linking portion 62 is reliably positioned at one of the low gear position or the high gear position.

The motor drive circuit 74 uses FETs or other conventional electronic components for PWM drive of the motor 72, for example. The motor drive circuit 74 drives the motor 72 in response to commands from the gear shift controller 130. The cable linking portion 62 is non-rotatably mounted on the revolving shaft 70, and the length L of a hypothetical arm line AR extending in the direction perpendicular to the gear shift cable 21 from the center of rotation O1 changes depending on the rotation phase. In FIG. 11 and FIG. 12, the hypothetical arm line AR is shown extending in the direction perpendicular to an extension line of the gear shift cable 21 from the center of rotation O1. The cable linking portion 62 has a first arm portion member 90 with a base end being non-rotatably mounted on the revolving shaft 70, and a second arm portion member 91 that is rotatably linked to the distal end of the first arm portion member 90. The second arm portion member 91 has at the distal end thereof a cable retaining portion 92 for retaining a cylindrical portion 21a formed on one end of the gear shift cable 21.

The first arm portion member 90 is a plate shape member extending generally diametrically outward from the center of rotation O1. The base end of the first arm portion member 90 is supported at both side surfaces by the mounting bracket 71 and the case member 60.

The second arm portion member 91 has the cable retaining portion 92 mentioned above, and a curved portion 93 that curves in arcuate shape from the cable retaining portion 92. A free end of the curved portion 93 is coupled to the first arm portion member 90. The second arm portion member 91 is linked with the first arm portion member 90 so as to sandwich the two surfaces at the distal end of the first arm portion member 90. By providing the second arm portion member 91 with a curved portion 93 as described above, when the front derailleur 97f is moved to the high gear position as shown in FIG. 12, the length of the hypothetical arm line AR shortens without the gear shift cable 21 interfering with the revolving shaft 70. Thus, for a given level of torque generated by the motor 72, stronger force acts on the gear shift cable 21 so that shifting to the high gear position, which requires strong force, can take place with a lower torque of the motor 72. Also, when the front derailleur 97f is moved to the low gear position as shown in FIG. 11, the length L of the hypothetical arm line AR is longer than at the high gear position as shown in FIG. 12, so the force acting on the gear shift cable 21 becomes weaker.

With the front gear shift drive device 20 having such an arrangement, when one of the front shifter portions 120f and 121f is operated with the front derailleur 97f in the low gear position to turn on the front upshift switch 131f, the motor 72 turns in a first direction moving the cable linking portion 62 from the low gear position shown in FIG. 11 to the high gear position shown in FIG. 12. As a result, the gear shift cable 21 is tensioned, and the front derailleur 97f moves from the low gear position shown in FIG. 10 to the high gear position shown in FIG. 9. At this time, the length L of the hypothetical arm line AR gradually becomes shorter depending on the rotation phase of the cable linking portion 62, with the length L of the hypothetical arm line AR reaching its minimum length at the high gear position. As a result, when the cable linking portion 62 rotates from the low gear position to the high gear position, the force exerted on the gear shift cable 21 increases gradually.

On the other hand, when one of the front shifter portions 120f and 121f is operated with the front derailleur 97f in the high gear position to turn on the front downshift switch 132f, the motor turns in the other direction moving the cable linking portion 62 from the high gear position shown in FIG. 12 to the low gear position shown in FIG. 11. As a result, force ceases to act on the gear shift cable 21, and under the urging force of the coil spring 45 the front derailleur 97f moves from the high gear position shown in FIG. 9 to the low gear position shown in FIG. 10.

In this first embodiment of the present invention, since the cable linking portion 62 is mounted on the revolving shaft 70 in such a way that the length L of the hypothetical arm line AR extending in the direction perpendicular to the gear shift cable 21 from the center of rotation O1 changes, the level of torque required from the motor 72 in order to perform the gearshift operation can be reduced, with a simple structure.

Moreover, with the front derailleur 97f of the first embodiment of the present invention, the first arm portion 44 is configured and arranged such that the first arm portion 44 does not interfere with the chain guide 41 when the front derailleur 97f moves from the low speed position shown in FIG. 10 to the high speed shown in FIG. 9. Also, in the front derailleur 97f, the coil spring is disposed such that the distance D between the center axis SL of the coil spring 45 and the center of rotation SC of the outer link support 50c, which is the center of rotation of the outer link 43, becomes the shortest. Thus, by having the center axis SL of the coil spring 45 close to the center of rotation SC of the outer link 43, the torque arising from the biasing force of the coil spring 45 becomes smaller and the operating force (the force pulling the gear shift cable 21) decreases in the vicinity of the high speed position (the position of the chain guide 41 approaching the sprocket F2) when the coil spring 45 is at its farthest extent and the biasing force is strong. Because of this, with the use of the front derailleur 97f in the present embodiment, the torque of the motor of the front gear shift drive device 20 can be even smaller.

Accordingly, with the front derailleur 97f of the first embodiment, when the gear shift cable 21, which is retained with the outer link 43, is pulled in opposition to the biasing force of the coil spring 45 whose end is connected to the tip of the first arm portion 44 of the outer link 43, both of the inner link 42 and the outer link 43 swing below the base bracket 40 so that the chain guide 41 moves away from the base bracket 40. The chain 95 is guided outward into the sprocket which normally has a larger diameter for high speed. When the chain guide 41 is disposed in a position farthest outward (high speed side), the coil spring 45 is extended at its utmost and the spring force of the coil spring 45 becomes stronger. Therefore, the force drawing the gear shift cable 21 becomes stronger too. In the first embodiment of the present invention, the outer link 43 is provided with the first arm portion 44 extending in a direction away from the base bracket 40. Since the force is applied in the direction approaching the base bracket 40 using the coil spring 45 and both ends of the coil spring 45 are connected to the first arm portion 44 and the base bracket 40, the distance D between the center axis SL of the coil spring 45 and the center of rotation SC of the outer link 43 can vary depending on the shift positions of the chain guide 41. Thus, when the chain guide 41 moves away farthest from the base bracket 40, at the farthest extension of the coil spring 45 with the strongest biasing force, the center axis SL of the coil spring 45 can be disposed closer to the center of rotation SC of the outer link 43. Accordingly, when the center axis SL of the coil spring 45 approaches the center of rotation SC, the torque arising from the applied force of the coil spring 45 becomes smaller and the force acting on the gear shift cable 21 can be made smaller. In this way, the necessary operational force for up-shifting can be reduced as much as possible.

Moreover, the coil spring 45 is arranged such that when the chain guide 41 moves the farthest away from the base member 50, the center of rotation SC of the outer link 43 and the center axis SL of the coil spring 45 approach closest together. Therefore, when the chain guide 45 is moved farthest away from the base member 50, since the center axis SL of the coil spring 45 comes nearest to the center of rotation SC of the outer link 43, the necessary operational force can be reduced when up-shifting.

The coil spring 45 is further arranged such that the center axis SL approaches the center of rotation SC as the chain guide 41 moves away from the base member 50 in a position the farthest away from the base member 50 toward the base member 50. Therefore, as the coil spring 45 extends, since the distance D between the center axis SL and the center of rotation SC becomes shorter, though the applied force of the coil spring 45 becomes greater, the torque does not become greater in proportion with the applied force. Accordingly, it is possible to decrease the operational force gradually when up-shifting.

Moreover, the second arm portion 46 is provided on the outer link 43 that extends in a direction away from the base member 50, and the second arm portion 46 includes the cable retaining portion 43a on the tip thereof. Therefore, since the distance from the center of rotation SC to the cable retaining portion 43a for retaining the gear shift cable 21 becomes longer, the force acting on shift cable 21 can be further smaller.

The first arm portion 44 extends in a curved shape from a portion between coupling portions of the outer link 43 and the base member 50 and the chain guide 41. Therefore, since the first arm portion 44 extends from a position near the center of rotation SC, it is easy for the center axis SL of the coil spring 45 to approach the center of rotation SC of the outer link 43.

Second Embodiment

Figure 13:
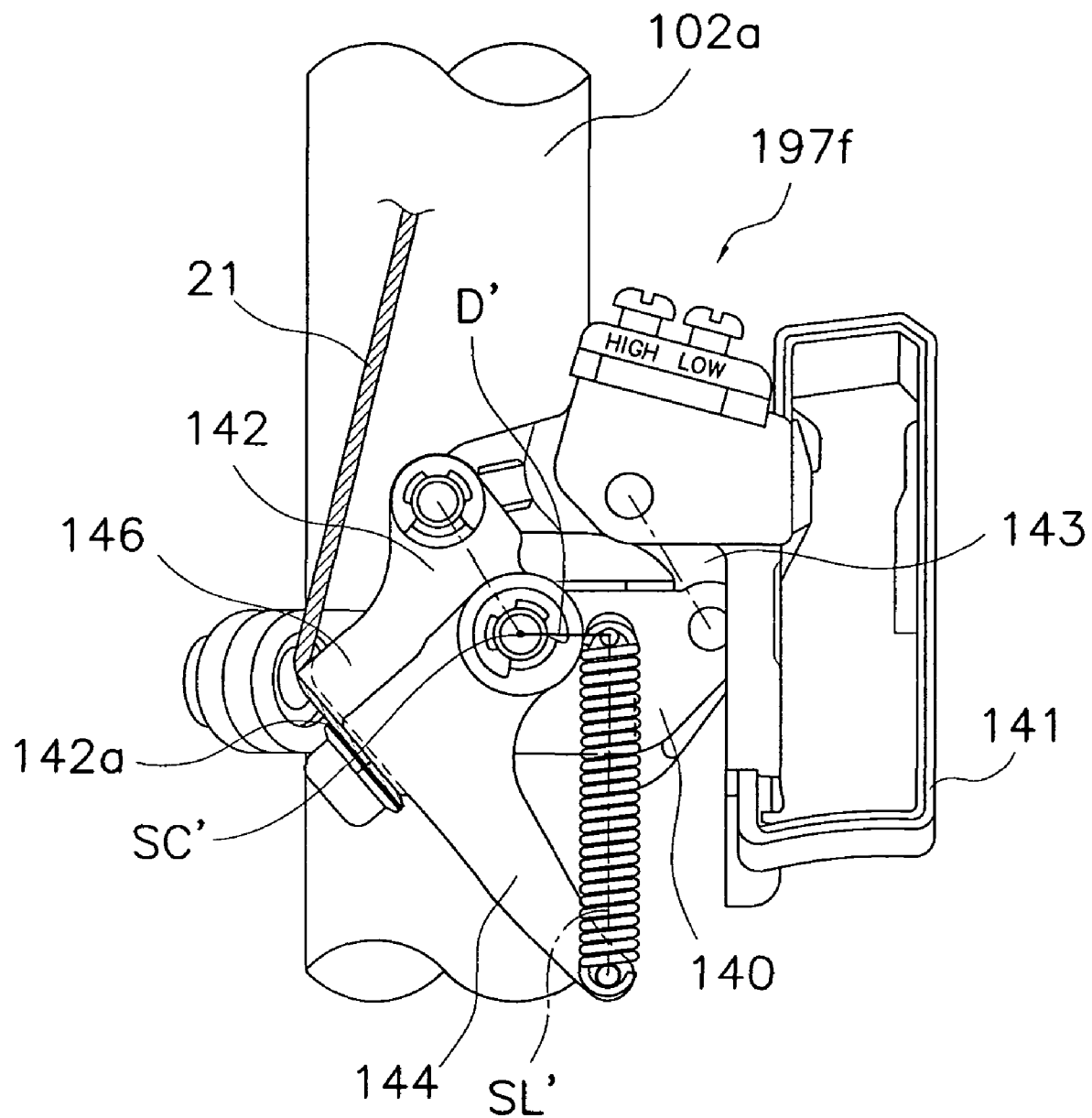
FIG. 13 is a rear elevational view of a front derailleur showing when the front derailleur is in high speed position in accordance with a second embodiment of the present invention.
Figure 14:
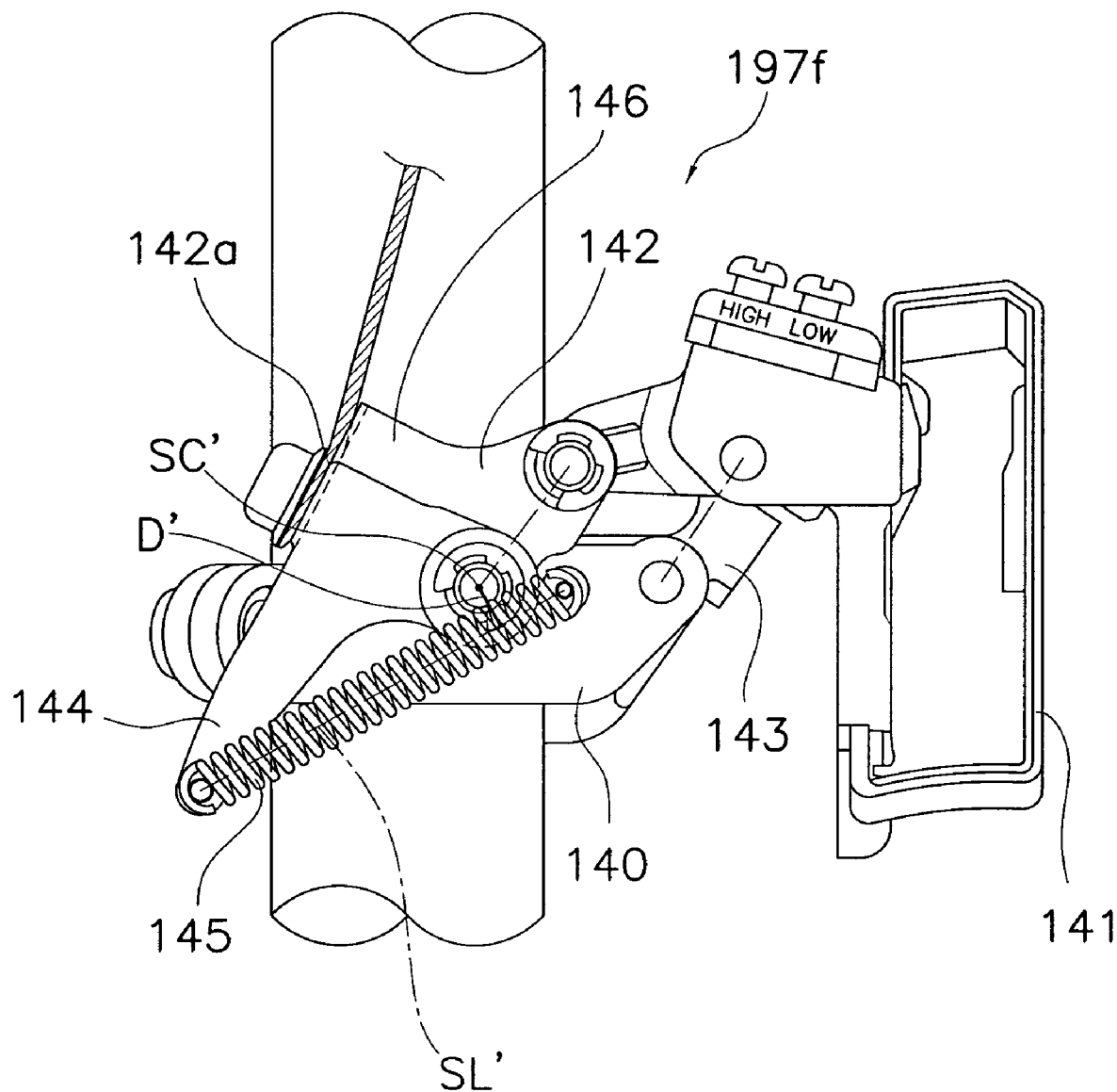
FIG. 14 is a rear elevational view of the front derailleur illustrated in FIG. 13 showing when the front derailleur is in low speed position in accordance with the second embodiment of the present invention.

Referring now to FIGS. 13 and 14, a front derailleur 197f in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The difference between the front derailleur 97f of the first embodiment and the front derailleur 197f of the second embodiment is that, although the front derailleur 97f of the first embodiment is arranged as a down-swing type down-pull derailleur wherein the inner link 42 and the outer link 43 swing under the base bracket 40, the front derailleur 197f of the second embodiment is arranged as a top-swing type derailleur wherein an inner link 142 and an outer link 143 swing above a base bracket 140.

As seen in FIGS. 13 and 14, the front derailleur 197f is preferably a 3-step gear shifting device in which 3 gear shift positions, low speed, middle speed, and high speed are provided. The front derailleur 197f is arranged as the up-pull type derailleur which is configured and arranged to pull the gear shift cable 21 upwardly. FIG. 13 illustrates when a chain guide 141 of the front derailleur 197f is in the low speed position and FIG. 14 illustrates when the chain guide 141 is in the high speed position.

The front derailleur 197f basically comprises the base bracket 140, the chain guide 141, the inner link 142, the outer link 143, a first arm portion 144, a coil spring 145 and a second arm portion 146. The base bracket 140 is installed on the seat tube 102a of the bicycle 101 shown in FIG. 1. The chain guide 141 moves freely in a direction away from the base bracket 140 to perform the gear shift operation. The inner link 142 and the outer link 143 are disposed parallel to each other and connect the base bracket 140 and chain guide 141 such that the chain guide 141 can freely swing with respect to the base bracket 140. The first arm portion 144 extends from the inner link 142 in a direction spaced apart from the base bracket 140. An upper end of the coil spring 145 is connected to the base bracket 140 and a lower end of the coil spring 145 is connected to a tip of the first arm portion 144. The coil spring 145 is configured and arranged to exert a biasing force in a direction toward the seat tube 102a so that the chain guide 141 is biased toward the seat tube 102a. The second arm portion 146 extends from the outer link 143 in a direction spaced apart from the base bracket 140. The gear shift cable 21 is attached to the tip of the second arm portion 146. In the second embodiment, the gear shift cable 21 is pulled upwardly. The second arm portion 146 includes a cable retaining portion 142a on the tip of the second arm portion 146 for attaching the gear shift cable 21. The structures of the other components of the front derailleur 197f are similar to the structures of the front derailleur 97f of the first embodiment, and thus, the descriptions of the other components are omitted herein for the sake of brevity.

With the front derailleur 197f of the second embodiment, similar to the above mentioned embodiment, a distance D' between a center axis SL' of the coil spring 145 and a center of rotation SC' becomes a minimum value and the torque arising from the exerting force of the coil spring 145 becomes small when the biasing force exerted by the coil spring 145 is great and when in high peed position as shown in FIG. 14. Thus, the force acting on the gear shift cable 21 is decreased as much as possible. Accordingly, the force required for the gear shift operation can be relatively small.

Accordingly, with the front derailleur 97f of the first embodiment, when the gear shift cable 21, which is retained with the outer link 143, is pulled in opposition to the biasing force of the coil spring 145 whose end is connected to the tip of the first arm portion 144 of the inner link 142, both of the inner link 142 and the outer link 143 swing above the base bracket 140 so that the chain guide 141 moves away from the base bracket 140. The chain is guided outward into the sprocket which normally has a larger diameter for high speed. When the chain guide 141 is disposed in a position farthest outward (high speed side), the coil spring 145 is extended at its utmost and the spring force of the coil spring 145 becomes stronger. Therefore, the force drawing the gear shift cable 21 becomes stronger too. In the second embodiment of the present invention, the inner link 142 is provided with the first arm portion 144 extending in a direction away from the base bracket 140. Since the force is applied in the direction approaching the base bracket 140 using the coil spring 145 and both ends of the coil spring 145 are connected to the first arm portion 144 and the base bracket 140, the distance D' between the center axis SL' of the coil spring 145 and the center of rotation SC' of the inner link 142 can vary depending on the shift position of the chain guide 141. Thus, when the chain guide 141 moves away farthest from the base bracket 140, at the farthest extension of the coil spring 145 with the strongest biasing force, the center axis SL' of the coil spring 145 can be disposed closer to the center of rotation SC' of the inner link 142. Accordingly, when the center axis SL' of the coil spring 145 approaches the center of rotation SC', the torque arising from the applied force of the coil spring 145 becomes smaller and the force acting on the gear shift cable 21 can be made smaller. In this way, the necessary operational force for up-shifting can be reduced as much as possible.

Third Embodiment

Figure 15:
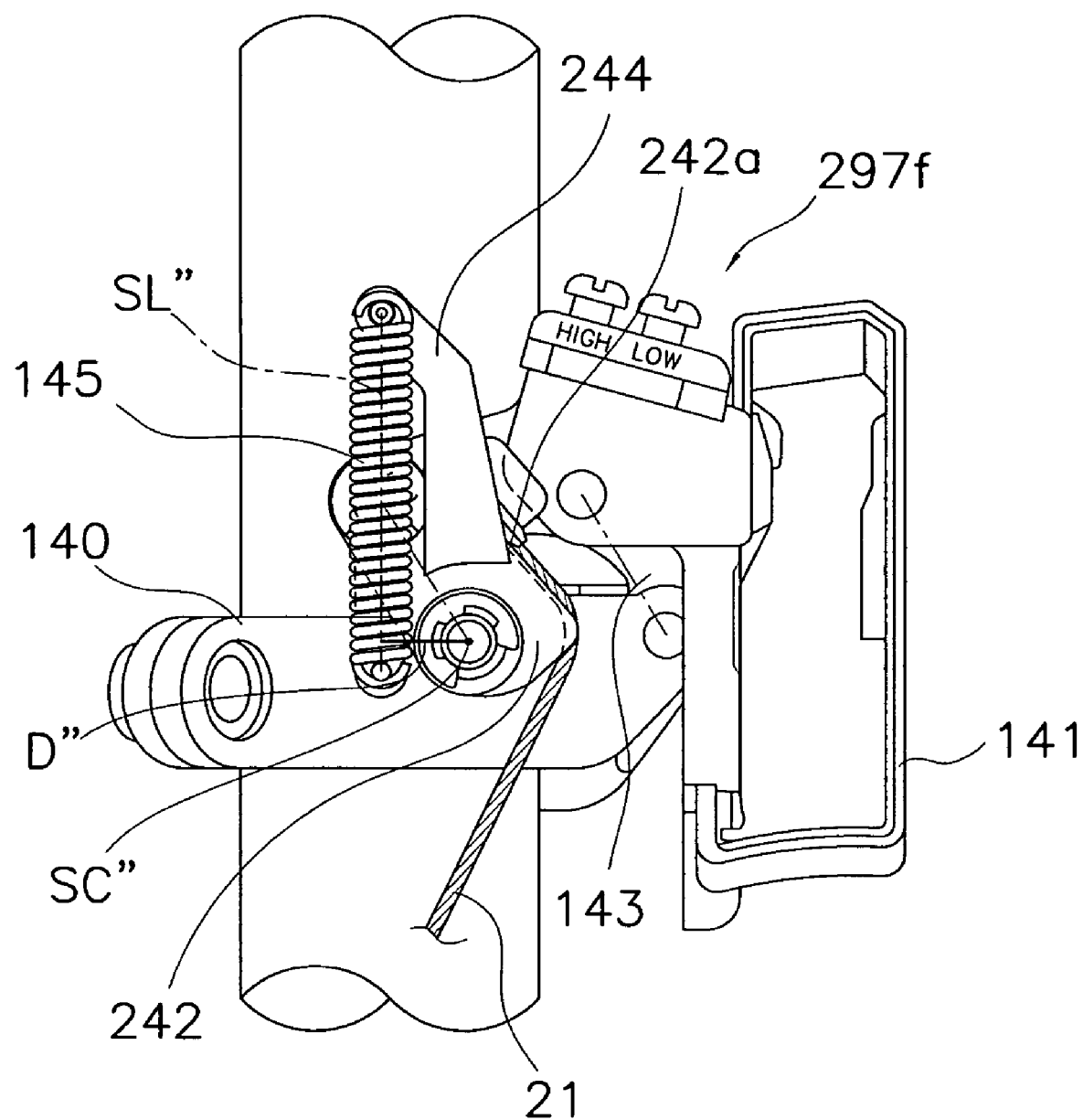
FIG. 15 is a rear elevational view of a front derailleur showing when the front derailleur is in high speed position in accordance with a third embodiment of the present invention.
Figure 16:
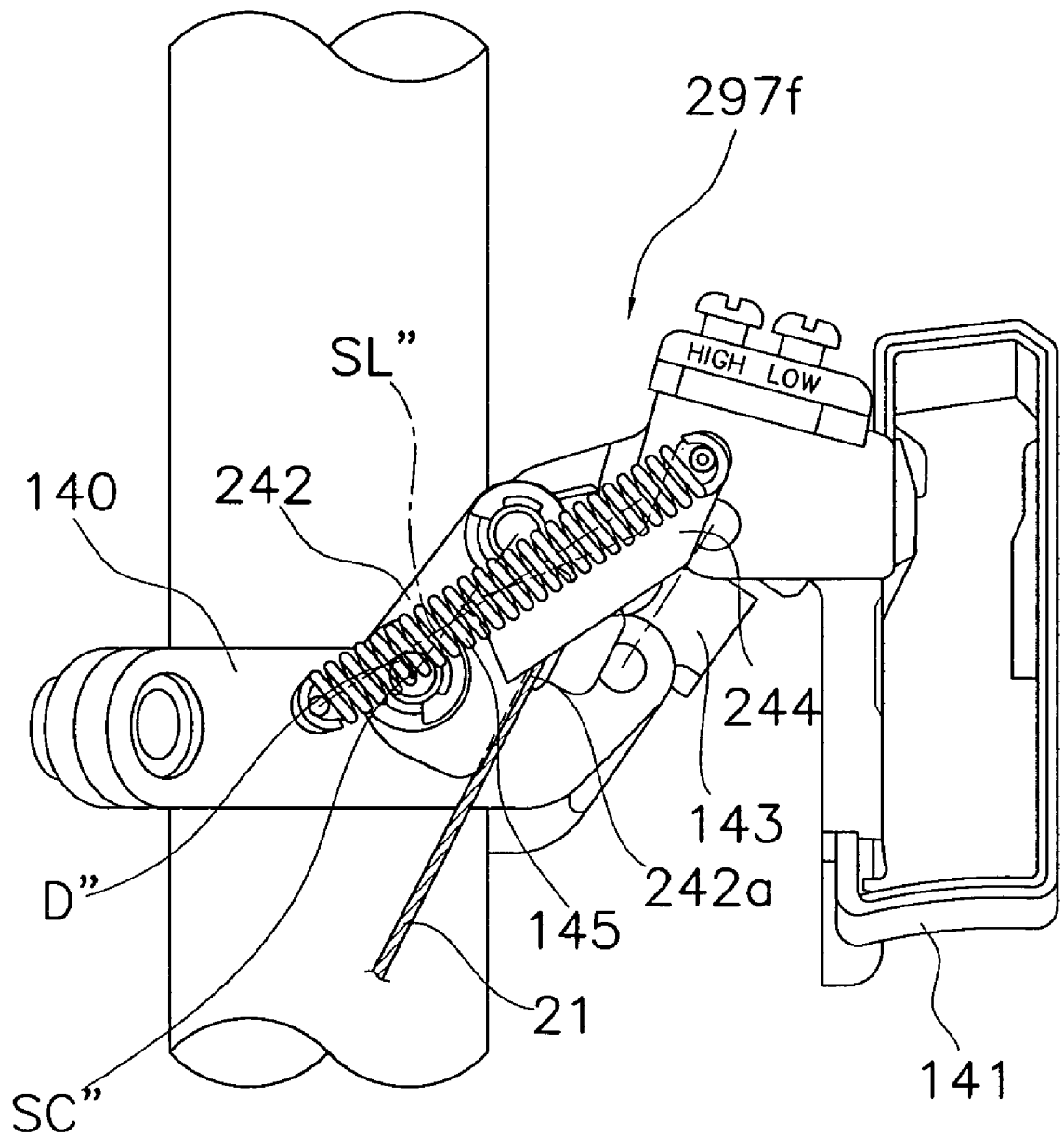
FIG. 16 is a rear elevational view of the front derailleur illustrated in FIG. 15 showing when the front derailleur is in low speed position in accordance with the third embodiment of the present invention.

Referring now to FIGS. 15 and 16, a front derailleur 297f in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

As seen in FIGS. 15 and 16, the front derailleur 297f of the third embodiment is arranged as a down-pull top swing type derailleur. When the front derailleur 297f is arranged as the down-pull top swing type derailleur, in order to avoid an interference of a cable retaining portion 242a disposed in an opposite side of the cable retaining portion 142a as shown in FIGS. 13 and 14, a first arm portion 244 extends upwardly from a center portion of the inner link 242. FIG. 15 illustrates when the chain guide 141 is placed in the low speed position and FIG. 16 illustrates when the chain guide 141 is placed in the high speed position. With the third embodiment of the present invention, a distance D" between a center axis SL" of the coil spring 145 and a center of rotation SC" becomes a minimum value and the torque arising from the exerting force of the coil spring 145 becomes small when the biasing force of the coil spring 145 is at its greatest and when the chain guide 141 is in the high speed position as shown in FIG. 16. Thus, the force acting on the gear shift cable 21 decreases as much as possible. Therefore, the force required for the gear shift operation will be relatively small. Also, with the third embodiment of the present invention, the front derailleur 297f is not provided with a second arm portion. Of course, the present invention can be applied to a down swing down pull type derailleur that is not mentioned in the above explained embodiments.

In the above mentioned embodiments, the invention was described in an example with the gear shift cable 21 as transmission member. However, the transmission member of the present invention can also be arranged as a rod, link, or the like as long as the transmission member the front derailleur to move.

In the above mentioned embodiments, the front gear shift drive device and the front derailleur are connected with the transmission member. However, a first arm portion member can be provided that is connected rigidly to the revolving axle 70 of the front gear shift drive device which is used as the transmission member. In this case, the front gear shift drive device can be configured and arranged to directly drive the front derailleur.

In the above mentioned embodiments, the gear shifting operation is carried out by the front gear shift drive device. However, the present invention can be adapted to the front derailleur that is shifted by a conventional manual method with a gear shift lever.

In the first embodiment with the down-swing front derailleur 97f, the first arm portion 44 is provided on the outer link 43. In the second and third embodiments with the top-swing front derailleur 197f and 297f, the first arm portions 144 and 244 are provided on the inner links 142 and 242, respectively. However, the present invention is not limited to these arrangements of the inner and outer links and the first arm portion. For example, a first arm portion may be provided on the inner link 42 with the down-swing front derailleur 97f or a first arm portion may be provided on the outer links 143 and 243 with the top-swing front derailleur 197f and 297f.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A front derailleur for a bicycle adapted to be installed on a frame of the bicycle for guiding a chain into one of a plurality of shift positions in accordance with movement of a transmission member, the front derailleur comprising:
    a base member configured and arranged to be installed on the frame;
    a chain guide freely movable with respect to the base member in a shifting direction away from the base member to guide the chain into one of the shift positions;
    an inner link being freely rotatably connected to the base member at a first pivot connection and to the chain guide at a second pivot connection;
    an outer link disposed substantially parallel to the inner link in a position spaced apart from the base member with respect to the inner link with the outer link being freely rotatably connected to the base member at a first pivot connection and to the chain guide at a second pivot connection;
    a first arm portion fixed to one of the inner link and the outer link and extending outwardly from the one of the inner link and the outer link having the first arm portion in a direction away from the base member; and
    a coil spring with a first end attached to the base member and a second end attached to a free end of the first arm portion at a fixed attachment point that is spaced from the first and second pivot connections of the one of the inner and outer links having the first arm portion, the coil spring applying a biasing force on the chain guide in a direction toward the frame when the base member is installed on the frame,
    the first arm portion being arranged with the fixed attachment point disposed such that a center axis of the coil spring approaches a center of rotation of the first pivot connection of the one of the inner and outer links having the first arm portion as the chain guide moves from a position closest to the base member toward a position that is farthest apart from the base member.

2. The front derailleur as recited in claim 1, wherein the inner link is disposed below the base member when the base member is installed on the frame.

3. The front derailleur as recited in claim 2, further comprising
    a second arm portion extending from one of the inner link and the outer link in the direction away from the base member, the second arm portion having a free end configured and arranged to be attached to the transmission member.

4. The front derailleur as recited in claim 3, wherein the first and second arm portions extend from the outer link in directions substantially away from each other.

5. The front derailleur as recited in claim 2, wherein the first arm portion extends from a portion between the first pivot connections of the one of the inner link and the outer link having the first arm portion.

6. The front derailleur as recited in claim 2, wherein the first arm portion extends from the one of the outer link and the inner link having the first arm portion toward the frame when the base member is coupled to the frame.

7. The front derailleur as recited in claim 2, wherein the first arm portion extends from the one of the outer link and the inner link having the first arm portion in a generally upward direction when the base member is installed on the frame.

8. The front derailleur as recited in claim 1, further comprising
    a second arm portion extending from one of the inner link and the outer link in the direction away from the base member, the second arm portion having a free end configured and arranged to be attached to the transmission member.

9. The front derailleur as recited in claim 1, wherein the first arm portion extends from a portion between the first and second pivot connections of the one of the inner link and the outer link having the first arm portion.

10. The front derailleur as recited in claim 1, wherein the first arm portion extends from the one of the inner link and the outer link having the first arm portion in a generally downward direction when the base member is installed on the frame.

11. The front derailleur as recited in claim 1, wherein the first arm portion extends from the one of the inner link and the outer link having the first arm portion in a generally upward direction when the base member is installed on the frame.

12. The front derailleur as recited in claim 1, wherein the inner link is configured and arranged to be disposed above the base member when the base member is installed on the frame.

13. The front derailleur as recited in claim 12, wherein the first arm portion is configured and arranged so that the center axis of the coil spring is disposed adjacent to the center of rotation of the one of the inner link and the outer link with the first arm portion with respect to the base member when the chain guide is placed in the position that is farthest apart from the base member.

14. The front derailleur as recited in claim 13, wherein
the first arm portion is configured and arranged so that the center axis of the coil spring approaches the center of rotation as the chain guide moves from the position closest to the base member toward the position that is farthest apart from the base member.

15. The front derailleur as recited in claim 12, further comprising
a second arm portion extending from one of the inner link and the outer link having a free end configured and arranged to be attached to the transmission member.

16. The front derailleur as recited in claim 12, wherein
the first arm portion extends from the one of the inner link and the outer link having the first arm portion in a generally downward direction when the base member is installed on the frame.

17. The front derailleur as recited in claim 12, wherein
the first arm portion extends from the one of the inner link and the outer link having the first arm portion in a generally upward direction when the base member is installed on the frame.

18. A front derailleur for a bicycle adapted to be installed on a frame of the bicycle for guiding a chain into one of a plurality of shift positions in accordance with movement of a transmission member, the front derailleur comprising:
a base member configured and arranged to be installed on the frame;
a chain guide freely movable with respect to the base member in a shifting direction away from the base member to guide the chain into one of the shift positions;
an inner link being freely rotatably connected to the base member at a first pivot connection and to the chain guide at a second pivot connection;
an outer link disposed substantially parallel to the inner link in a position spaced apart from the base member with respect to the inner link with the outer link being freely rotatably connected to the base member at a first pivot connection and to the chain guide at a second pivot connection;
a first arm portion extending from one of the inner and outer links in a direction away from the base member; and
a coil spring with first and second ends connected to the base member and a fixed attachment point of the first arm portion, respectively, the coil spring applying a biasing force on the chain guide in a direction toward the frame when the base member is installed on the frame,
the first arm portion being arranged so that the first pivot connections of the inner and outer links are disposed on opposite sides of a center axis of the coil spring as viewed along a direction parallel a chain movement direction through a chain slot of the chain guide,
the first arm portion being arranged with the fixed attachment point disposed such that the center axis of the coil spring is disposed adjacent to a center of rotation of the first pivot connection of the one of the inner link and the outer link without the first arm portion with respect to the base member when the chain guide is placed in a position that is closest the base member and the biasing force decreases as the center axis of the coil spring moves away from the first pivot connection of the one of the inner link and the outer link without the first arm portion and approaches the center of rotation of the first pivot connection of the one of the inner and outer links having the first arm portion as the chain guide moves from the position closest to the base member toward a position that is farthest apart from the base member.

19. A front derailleur for a bicycle adapted to be installed on a frame of the bicycle for guiding a chain into one of a plurality of shift positions in accordance with movement of a transmission member, the front derailleur comprising:
a base member configured and arranged to be installed on the frame;
a chain guide freely movable with respect to the base member in a shifting direction away from the base member to guide the chain into one of the shift positions;
an inner link being freely rotatably connected to the base member at a first pivot connection and to the chain guide at a second pivot connection;
an outer link disposed substantially parallel to the inner link in a position spaced apart from the base member with respect to the inner link with the outer link being freely rotatably connected to the base member at a first pivot connection and to the chain guide at a second pivot connection;
a first arm portion extending outwardly from one of the inner and outer links in a direction away from the base member; and
a coil spring having a first end attached to the base member at a fixed attachment point that is spaced from the first pivot connections of the inner and outer links to the base member and a second end attached to a free end of the first arm portion of the one of the inner and outer links having the first arm, the coil spring applying a biasing force on the chain guide in a direction toward the frame when the base member is installed on the frame,
the first arm portion being arranged with the fixed attachment point disposed such that a center axis of the coil spring approaches a center of rotation of the first pivot connection of the one of the inner and outer links having the first arm portion as the chain guide moves from a position closest to the base member toward a position that is farthest apart from the base member and the biasing force decreases as the center axis of the coil spring approaches the center of rotation of the first pivot connection of the one of the inner and outer links having the first arm portion as the chain guide moves from the position closest to the base member toward the position that is farthest apart from the base member.

* * * * *